United States Patent
Pan et al.

(10) Patent No.: US 11,907,671 B2
(45) Date of Patent: Feb. 20, 2024

(54) ROLE LABELING METHOD, ELECTRONIC DEVICE AND STORAGE MEDIUM

(71) Applicant: BEIJING BAIDU NETCOM SCIENCE TECHNOLOGY CO., LTD., Beijing (CN)

(72) Inventors: Zhenglin Pan, Beijing (CN); Jie Bai, Beijing (CN); Yi Wang, Beijing (CN)

(73) Assignee: BEIJING BAIDU NETCOM SCIENCE TECHNOLOGY CO., LTD., Beijing (CN)

( * ) Notice: Subject to any disclaimer, the term of this patent is extended or adjusted under 35 U.S.C. 154(b) by 288 days.

(21) Appl. No.: 17/450,595

(22) Filed: Oct. 12, 2021

(65) Prior Publication Data
US 2022/0043985 A1    Feb. 10, 2022

(30) Foreign Application Priority Data
Oct. 14, 2020    (CN) .......................... 202011098949.1

(51) Int. Cl.
*G06F 40/35*    (2020.01)
*G06F 16/33*    (2019.01)
(Continued)

(52) U.S. Cl.
CPC .......... *G06F 40/35* (2020.01); *G06F 16/3334* (2019.01); *G06F 16/35* (2019.01); *G06F 40/279* (2020.01)

(58) Field of Classification Search
CPC .... G06F 16/3334; G06F 16/35; G06F 40/279; G06F 40/35
See application file for complete search history.

(56) References Cited

U.S. PATENT DOCUMENTS

| 5,752,016 A | * | 5/1998 | Whittaker ........... G06F 16/2428 |
| 2012/0290561 A1 | * | 11/2012 | Kobayashi .......... G06F 16/3344 |
| | | | 707/E17.062 |

(Continued)

FOREIGN PATENT DOCUMENTS

| CN | 107766565 A | 3/2018 |
| CN | 108091321 A | 5/2018 |

(Continued)

OTHER PUBLICATIONS

Office Action for Japanese Application No. 2021-122253, dated Oct. 4, 2022, 6 pages.

(Continued)

*Primary Examiner* — Eric Yen
(74) *Attorney, Agent, or Firm* — Lippes Mathias LLP (57) ABSTRACT

The disclosure provides a role labeling method. The method includes: obtaining a dialogue sentence to be labeled and context information corresponding to the dialogue sentence, and splicing the context information and the dialogue sentence to obtain a spliced text; extracting location information of a role name of the dialogue sentence in the spliced text from the spliced text; determining a first candidate role name of the dialogue sentence based on the location information; determining a second candidate role name of the dialogue sentence from role names in the spliced text; and determining a target role name of the dialogue sentence based on the first candidate role name and the second candidate role name, and performing role labeling on the dialogue sentence based on the target role name.

20 Claims, 5 Drawing Sheets

(51) Int. Cl.
*G06F 16/35* (2019.01)
*G06F 40/279* (2020.01)

(56) References Cited

U.S. PATENT DOCUMENTS

| | | | |
|---|---|---|---|
| 2018/0285348 A1* | 10/2018 | Shu | G06N 3/084 |
| 2018/0336898 A1 | 11/2018 | Cook et al. | |
| 2019/0163691 A1* | 5/2019 | Brunet | G06F 16/35 |
| 2020/0344194 A1* | 10/2020 | Hosseinisianaki | G06N 3/084 |
| 2022/0058342 A1* | 2/2022 | Fan | G06N 5/04 |
| 2022/0222441 A1* | 7/2022 | Liu | G06N 3/08 |

FOREIGN PATENT DOCUMENTS

| | | |
|---|---|---|
| CN | 108735200 A | 11/2018 |
| CN | 109101487 A | 12/2018 |
| CN | 109658916 A | 4/2019 |
| CN | 110399461 A | 11/2019 |
| CN | 111158630 A | 5/2020 |
| JP | H05313685 A | 11/1993 |
| JP | H0772888 A | 3/1995 |
| JP | H08248971 A | 9/1996 |

OTHER PUBLICATIONS

"Towards for development of tagged dialogue corpus of Japanese novel", The 1st Annual Conference of the Japanese Society for Artificial Intelligence 2017, 4 pages, May 23, 2017, Abstract.

Office Action for CN application No. 202011098949.1, dated Jun. 23, 2021, 5 pages.

English translation of Office Action for CN application No. 202011098949.1, dated Jun. 23, 2021, 5 pages.

* cited by examiner

ROLE LABELING METHOD, ELECTRONIC DEVICE AND STORAGE MEDIUM

CROSS-REFERENCE TO RELATED APPLICATION

This application claims priority to and benefits of Chinese Patent Application Serial No. 202011098949.1, filed with the State Intellectual Property Office of P. R. China on Oct. 14, 2020, the entire content of which is incorporated herein by reference.

TECHNICAL FIELD

The disclosure relates to the field of computer techniques, specifically relates to the field of artificial intelligence technologies such as natural language processing and deep learning, in particular to a role labeling method, an electronic device and a storage medium.

BACKGROUND

Currently, mainstream audio novels in the market mainly have two product forms, i.e., single-character audio novels and multi-character audio novels. Multi-character audio novels are divided into two presentation forms, i.e., a form of human reading and a form of speech synthesis. In the related art, after obtaining a text, staffs may read the full text to label the dialogue sentences in the text and to learn a role name of each dialogue sentence.

SUMMARY

Embodiments of the first aspect of the disclosure provide a role labeling method. The method includes: obtaining a dialogue sentence to be labeled and context information corresponding to the dialogue sentence, and splicing the context information and the dialogue sentence to obtain a spliced text; extracting location information of a role name of the dialogue sentence in the spliced text from the spliced text; determining a first candidate role name of the dialogue sentence based on the location information; determining a second candidate role name of the dialogue sentence from role names in the spliced text; and determining a target role name of the dialogue sentence based on the first candidate role name and the second candidate role name, and performing role labeling on the dialogue sentence based on the target role name.

Embodiments of the second aspect of the disclosure provide an electronic device. The electronic device includes: at least one processor and a memory communicatively coupled to the at least one processor. The memory stores instructions executable by the at least one processor, and when the instructions are executed by the at least one processor, the at least one processor executes the role labeling method according to the first aspect of the disclosure.

Embodiments of the third aspect of the disclosure provide a non-transitory computer-readable storage medium storing computer instructions, the computer instructions are configured to make a computer to execute the role labeling method according to the first aspect of the disclosure.

It should be understood that the content described in this section is not intended to identify key or important features of the embodiments of the disclosure, nor is it intended to limit the scope of the disclosure. Additional features of the disclosure will be easily understood based on the following description.

BRIEF DESCRIPTION OF THE DRAWINGS

The drawings are used to better understand the solution and do not constitute a limitation to the disclosure, in which.

DETAILED DESCRIPTION

The following describes the exemplary embodiments of the disclosure with reference to the accompanying drawings, which includes various details of the embodiments of the disclosure to facilitate understanding, which shall be considered merely exemplary. Therefore, those of ordinary skill in the art should recognize that various changes and modifications can be made to the embodiments described herein without departing from the scope and spirit of the disclosure. For clarity and conciseness, descriptions of well-known functions and structures are omitted in the following description.

In the related art, manually labeling roles and dialogue sentence results in time-consuming, labeling cost is high, and labeling efficiency is low. In order to solve the above technical problems, the disclosure provides a role labeling method, a role labeling apparatus, an electronic device and a storage medium. In the disclosure, a dialogue sentence to be labeled and context information corresponding to the dialogue sentence are obtained, and the context information and the dialogue sentence are spliced to obtain a spliced text. Location information of a role name of the dialogue sentence in the spliced text is extracted from the spliced text. A first candidate role name of the dialogue sentence is determined based on the location information, and a second candidate role name of the dialogue sentence is determined from role names in the spliced text. A target role name of the dialogue sentence is determined based on the first candidate role name and the second candidate role name, and role labeling is performed on the dialogue sentence based on the target role name. Therefore, by determining the first candidate role name and the second candidate role name of the dialogue sentence from the spliced text, and then the target role name is determined, in order to realize the automatic role labeling of the dialogue sentences based on the target role name, cost and time of manual labeling are saved, and labeling efficiency is improved.

In the following, a role labeling method, a role labeling apparatus, an electronic device and a storage medium according to the embodiments of the disclosure are described with reference to the drawings.

Figure 1:
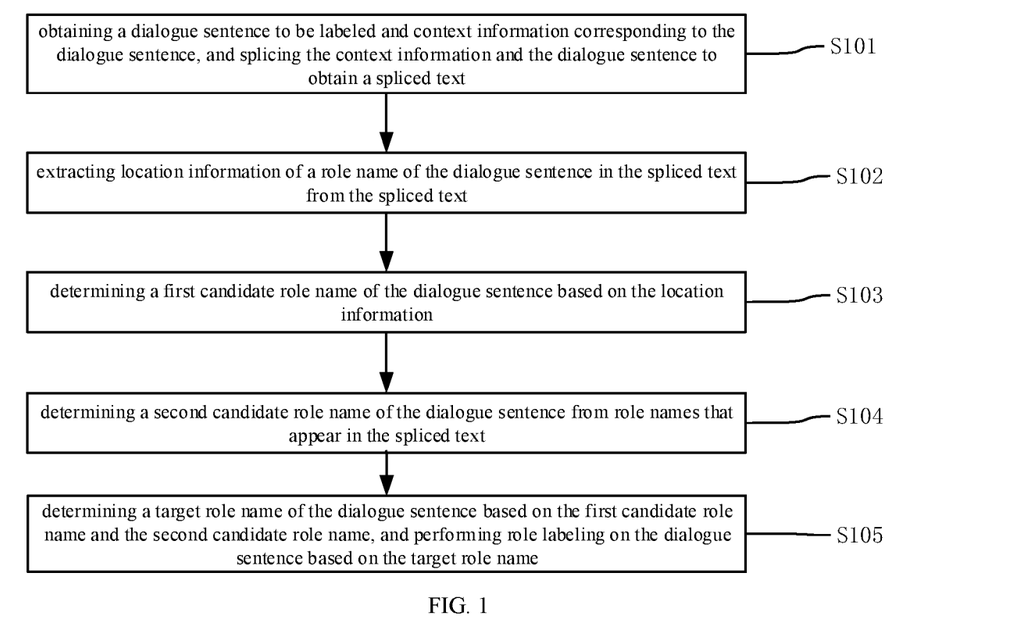
FIG. 1 is a schematic diagram of a role labeling method according to an embodiment of the disclosure.

FIG. 1 is a flowchart of a role labeling method according to some embodiments of the disclosure. It should be noted that the role labeling method of the embodiments of the disclosure may be applied to the role labeling apparatus of the embodiments of the disclosure, and the apparatus may be applied to an electronic device. The electronic device may include a terminal device or a server. For example, the terminal device include a smart phone, a tablet computer, a PAD, and a personal digital assistant, which is not limited in the embodiments of the disclosure.

At step S101, a dialogue sentence to be labeled and context information corresponding to the dialogue sentence are obtained, and the context information and the dialogue sentence are spliced to obtain a spliced text.

In an embodiment, the dialogue sentence to be labeled in a document and the context information corresponding to the dialogue sentence may be obtained through an electronic device, and the context information and the dialogue sentence may be spliced through the electronic device to obtain the spliced text. The document may be presented in any form, including but not limited to an electronic text, an audio, such as, an electronic text of a novel, a news audio and an electronic text of a script, which is not limited in the disclosure.

The document may be uploaded through a user interface by a user, or may be automatically obtained from the network based on a user request or a recognition request. In some embodiments, the document may be a text.

For example, the user may request to view novel A through the electronic device. After receiving a user request, the electronic device may search novel A on the Internet by using crawler technologies to obtain a document of novel A. Afterwards, the dialogue sentences and narration sentences are detected from the document of novel A, and then the dialogue sentence to be labeled and the context information corresponding to the dialogue sentence are obtained, and the context information and the dialogue sentence are spliced to obtain the spliced text. The dialogue sentence may refer to sentences spoken by characters in the document, and the narration sentences may refer to sentences other than dialogues in the document. For example, content of a document is as following: Xiao Li said "it's so beautiful here", Xiao Zhao said "indeed", so Xiao Li and Xiao Zhao continue to walk to the center of the garden. In this content, "it's so beautiful here" and "indeed" are dialogue sentences, and "Xiao Li and Xiao Zhao continue to walk to the center of the garden" is a narration sentence.

In an embodiment of the disclosure, a deep learning model may be adopted to distinguish dialogue sentences and narration sentences in an electronic text. For example, the deep learning model may perform text sentence splitting, sentence structure recognition, sentence semantic analysis and other text processing on the electronic text, so as to distinguish the dialogue sentences and the narration sentences. The sentence structure of the dialogue sentence is generally composed of a name of a speaker and words spoken by the speaker.

In an embodiment of the present disclosure, after distinguishing the dialogue sentences and the narration sentences, the dialogue sentences to be labeled and the corresponding context information are obtained based on electronic device's real-time detection of the document labeling, and the context information and the dialogue sentences are spliced to obtain the spliced text.

The context information corresponding to the dialogue sentence to be labeled may be obtained by following. A document where the dialogue sentence is located is obtained. And then, based on the location of the dialogue sentence in the document, N sentences located before a location of the dialogue sentence in the text are obtained, and M sentences located after the location of the dialogue sentence in the text are obtained. The sentences obtained are the context information of the dialogue sentence.

N and M are preset values. For example, N may be 7, and M may be 3. The values of N and M may be determined according to business requirements, which is not limited in this embodiment.

At step S102, location information of a role name of the dialogue sentence in the spliced text is extracted from the spliced text.

In an embodiment of the disclosure, when the spliced text is obtained, the spliced text may be input into an information extraction model to obtain the location information of the role name corresponding to the dialogue sentence in the spliced text. The location information includes a starting location and an ending location.

In an embodiment of the disclosure, the information extraction model may obtain the location information of the role name corresponding to the dialogue sentence in the spliced text based on a correspondence between role names of dialogue sentences and location information.

At step S103, a first candidate role name of the dialogue sentence is determined based on the location information.

In an embodiment of the disclosure, a target text between the starting location and the ending location may be extracted from the spliced text, and the first candidate role name corresponding to the dialogue sentence is determined according to the target text.

At step S104, a second candidate role name of the dialogue sentence is determined from role names that appear in the spliced text.

In an embodiment of the disclosure, the role names that appear in the spliced text may be obtained and input into a deep learning model. The deep learning model may score the role names by a scorer, and then the second candidate role name corresponding to the dialogue sentence is determined according to a scoring result of the role names. For example, a role name have the largest score may be determined as the second candidate role name.

In another embodiment of the disclosure, the role names in the spliced text may be obtained, and then each role name and the spliced text are input into a role classification model to obtain a probability of each role name acting as a role name of the dialogue sentence. The second candidate role name corresponding to the dialogue sentence is determined based on the probabilities of the role names. A specific implementation manner may refer to the subsequent embodiments.

At step S105, a target role name of the dialogue sentence is determined based on the first candidate role name and the second candidate role name, and role labeling is performed on the dialogue sentence based on the target role name.

In an embodiment of the disclosure, a role name set corresponding to a document where the dialogue sentence is located is obtained, and in a case of determining that both the first candidate role name and the second candidate role name exist in the role name set, one of the first candidate role name and the second candidate role name is selected randomly as the target role name of the dialogue sentence when the first candidate role name is the same as the second candidate role name.

With the role labeling method of the embodiments of the disclosure, the dialogue sentence to be labeled and the context information corresponding to the dialogue sentence are obtained, and the context information and the dialogue sentence are spliced to obtain a spliced text, the location information of the role name of the dialogue sentence in the spliced text is extracted from the spliced text, the first candidate role name of the dialogue sentence is determined based on the location information, the second candidate role name of the dialogue sentence is determined from the role names that appear in the spliced text, the target role name of the dialogue sentence is determined based on the first candidate role name and the second candidate role name, and role labeling is performed on the dialogue sentence based on the target role name. Therefore, the target role name is determined by determining the first candidate role name and the second candidate role name of the dialogue sentence from the spliced text, so as to realize automatic role labeling of the dialogue sentence based on the target role name, thus, the labor cost and time are saved, labeling efficiency is improved, and the problems such as high labor cost, long labeling duration, and low labeling efficiency caused by manual role labeling are solved.

Figure 2:
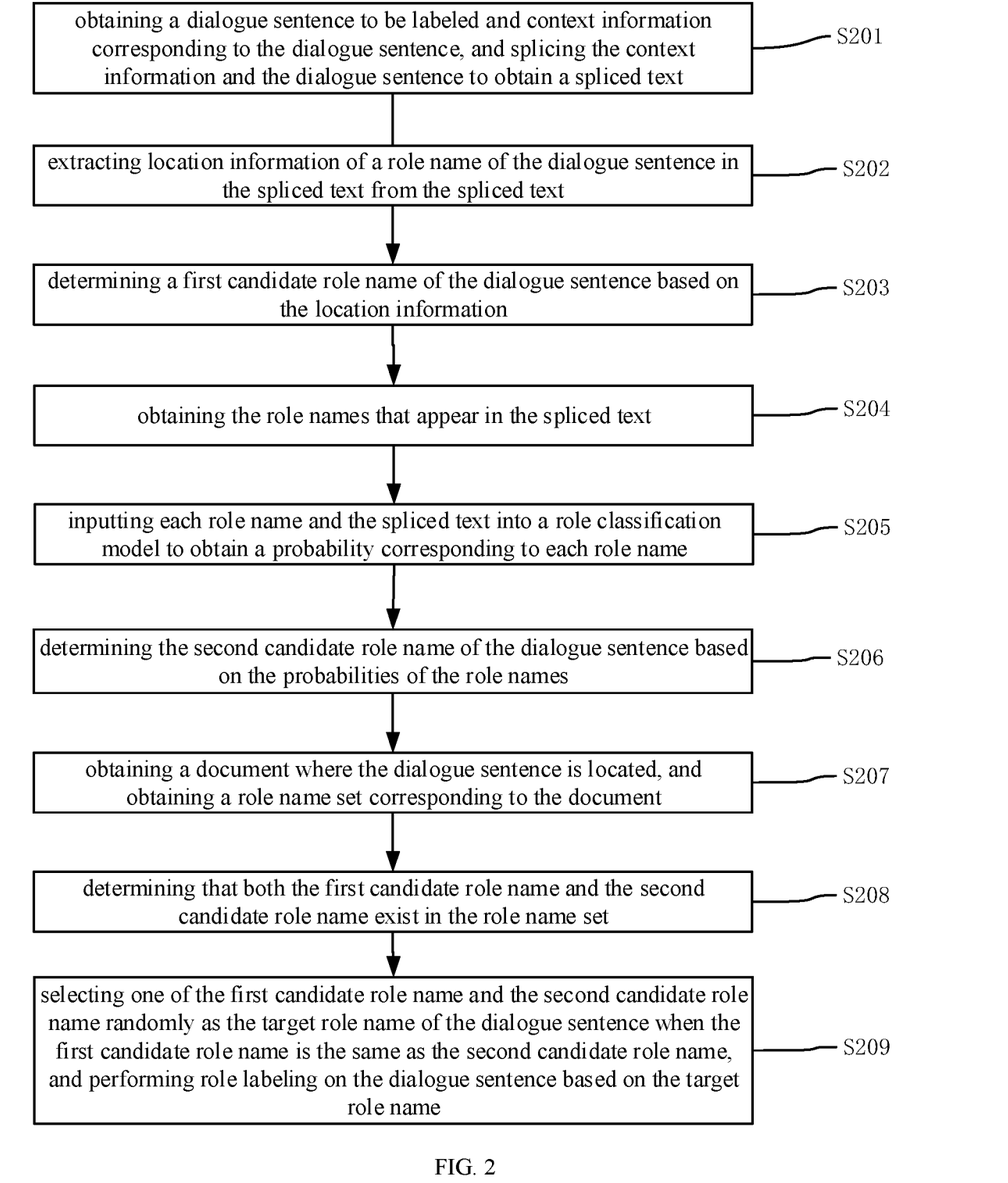
FIG. 2 is a schematic diagram of a role labeling method according to an embodiment of the disclosure.

For those skilled in the art to understand the disclosure more easily, FIG. 2 illustrates a flowchart of a role labeling method according to some embodiments of the disclosure. As illustrated in FIG. 2, the role labeling method may include the following.

At step S201, a dialogue sentence to be labeled and context information corresponding to the dialogue sentence are obtained, and the context information and the dialogue sentence are spliced to obtain a spliced text.

For example, the user may request to view novel A through the electronic device. After receiving a user request, the electronic device may search novel A on the Internet by using crawler technologies to obtain a document of novel A. Afterwards, the dialogue sentences and narration sentences are detected from the document of novel A, and then the dialogue sentence to be labeled and the context information corresponding to the dialogue sentence are obtained, and the context information and the dialogue sentence are spliced to obtain the spliced text. The dialogue sentence may refer to sentences spoken by characters in the document, and the narration sentences may refer to sentences other than dialogues in the document. For example, content of a document is as following: Xiao Li said "it's so beautiful here", Xiao Zhao said "indeed", so Xiao Li and Xiao Zhao continue to walk to the center of the garden. In this content, "it's so beautiful here" and "indeed" are dialogue sentences, and "Xiao Li and Xiao Zhao continue to walk to the center of the garden" is a narration sentence.

In an embodiment of the disclosure, the dialogue sentences and narration sentences may be detected from the document based on one or more keywords. A keyword may a words that indicates appearance of dialogue, such as "speak", "say", "shout" and "speak quietly". For example, if a keyword "speak" is detected in a sentence of the document, a part of the sentence following the keyword may be determined as a dialogue sentence, and other parts of the sentence may be determined as a narration sentence.

In another embodiment of the disclosure, the dialogue sentences and narration sentences may be detected from the document based on key punctuations. A key punctuation may be a punctuation indicating appearance of dialogue, such as double quotation marks and a colon. For example, if a pair of double quotation marks is detected in a sentence of the document, a part of the sentence within the pair of double quotation marks may be determined as a dialogue sentence, and other parts of the sentence may be determined as a narration sentence.

In an embodiment of the present disclosure, after distinguishing the dialogue sentences and the narration sentences, the dialogue sentences to be labeled and the corresponding context information are obtained based on electronic device's real-time detection of the document labeling, and the context information and the dialogue sentences are spliced to obtain the spliced text.

In an embodiment of the present disclosure, multiple sentences located before the dialogue sentence and multiple sentences located after the dialogue sentence may be obtained from the text. These obtained sentence may be determined as the context information corresponding to the dialogue sentence.

At step S202, location information of a role name of the dialogue sentence in the spliced text is extracted from the spliced text.

The location information includes a starting location and an ending location.

That is, after the spliced text is obtained, the starting location and the ending location of the role name corresponding to the dialogue sentence in the spliced text may be extracted from the spliced text.

Before extracting the starting location and the ending location of the role name of the dialogue sentence in the spliced text, the role name corresponding to the dialogue sentence may be determined first.

In some embodiments of the disclosure, various role names may be preset for a storyline of an electronic text, and the role names are stored according to a correspondence between role identifiers and the role names. For example, after a speaker in the dialogue sentence is determined, a corresponding role name may be determined according to a role identifier of the speaker.

In an embodiment of the disclosure, when the spliced text is obtained, the spliced text may be input into the information extraction model to obtain the starting location and the ending location of the role name of the dialogue sentence in the spliced text.

For example, the spliced text is obtained, the spliced text is input into a naming entity model, and the naming entity model performs role name recognition on the spliced text, so as to identify the role name corresponding to the dialogue sentence, and then the starting location and the ending location of the role name corresponding to the dialogue sentence in the spliced text are obtained by traversing the spliced text.

At step S203, a first candidate role name of the dialogue sentence is determined based on the location information.

In an embodiment of the disclosure, a target text between the starting location and the ending location may be extracted from the spliced text, and the first candidate role name corresponding to the dialogue sentence is determined according to the target text.

In a possible implementation, after the target text is obtained, the target text may be analyzed based on the named entity model, a new word discovery model and a synonymy thesaurus model, to determine the first candidate role name corresponding to the dialogue sentence. For example, a spliced text is: looking at Li Si, the founder of Wu-Tang Clan said in a soft voice: "Hello". According to the location information, the target text is determined to be "the founder of Wu-Tang Clan". According to a correspondence relationship between the role names and the keywords, a role name corresponding to "the founder of Wu-Tang Clan" is "Zhang Sanfeng". At this time, "Zhang Sanfeng" may be used as a candidate role name corresponding to the dialogue sentence.

At step S204, role names that appear in the spliced text are obtained.

In an embodiment of the disclosure, the spliced text is traversed to obtain the role names that appear in the spliced text.

In another embodiment of the disclosure, a document where the dialogue sentence is located is obtained, and a role name set corresponding to the document is obtained. The role name set includes a plurality of third candidate role names. For each third candidate role name, the third candidate role name is determined as a role name appearing in the spliced text in a case that a keyword corresponding to the third candidate role name exists in the spliced text.

At step S205, each role name and the spliced text are input into a role classification model to obtain a probability corresponding to each role name.

The role classification model includes an input layer, a semantic representation layer and a classification layer, the semantic representation layer includes a pre-trained language sub-mode, and the classification layer includes a classification sub-model.

In an embodiment of the disclosure, the role names appearing in the spliced text are acquired, and each role name and the spliced text are input into the role classification model to obtain the probability of a corresponding role name. The probability corresponding a role name refers to a probability that the role name acts as the role name of the dialogue sentence.

Through the input layer of the role classification model, a role name and the spliced text are spliced to obtain an intermediate spliced text, and then the intermediate spliced text is input into the pre-trained language sub-model in the semantic representation layer to obtain semantic characteristic information of the intermediate spliced text. The semantic characteristic information is input into the classification sub-model in the classification layer to obtain the probability of the role name as the role name of the dialogue sentence.

In an embodiment of the disclosure, bidirectional encoder representation from transformers (BERT) may be used to pre-train the language sub-model to enhance the semantic representation of a word. A semantic vector may be dynamically generated according to the context of the word, which effectively represents ambiguity of the word, improving accuracy of Chinese named entity recognition. Compared to a language-model-based fine-tuning method, training parameters are reduced and training time is saved.

In some embodiments of the disclosure, the classification sub-model is generally implemented by using a machine learning model that can achieve classification, such as an integrated tree model, a Bayes model, and a decision tree model. In the process of classification, the model usually outputs a classification result of the semantic characteristic information in a form of a numerical value. The classification result is the classification value corresponding to the semantic characteristic information. Taking the integrated tree model as an example, the model includes multiple levels of branches. According to a matching degree between the semantic characteristic information and the branches of each level, the semantic characteristic information is gradually divided until the end of a branch (also called a leaf node value) is reached. A weight value corresponding to the end of the branch is the classification value of the semantic characteristic information. The classification value of the semantic characteristic information may be understood as the probability of the role name as the role name of the dialogue sentence.

At step S206, the second candidate role name of the dialogue sentence is determined based on the probabilities of the role names.

In an embodiment of the disclosure, the probability of the role name as the role name of the dialogue sentence is obtained, and a role name with a relatively high probability may be used as the second candidate role name corresponding to the dialogue sentence.

In an embodiment of the disclosure, when there are a plurality of role names, a role name with the highest probability is selected as the second candidate role name of the dialogue sentence from the role names.

At step S207, a role name set corresponding to a document where the dialogue sentence is located is obtained.

In an embodiment of the disclosure, by obtaining role data corresponding to the document, a set of all the roles in the role data may be used as a candidate role name set corresponding to the dialogue sentence.

At step S208, it is determined that both the first candidate role name and the second candidate role name exist in the role name set.

That is, the role name set corresponding to the document where the dialogue sentence is obtained, a role name that is the same as the first candidate role name, and a role name that is the same as the second candidate role name are found from the role name set.

For example, by traversing the role name set, an identifier that is the same as an identifier of the first candidate role name, and an identifier that is the same as an identifier of the second candidate role name are found. Thus, the role name that is the same as the first candidate role name and the role name that is the same as the second candidate role name are determined.

At step S209, in a case that the first candidate role name is the same as the second candidate role name, one of the first candidate role name and the second candidate role name is randomly selected as the target role name of the dialogue sentence, and role labeling is performed on the dialogue sentence according to the target role name.

In an embodiment of the disclosure, a first ranking of the first candidate role name in a preset dictionary ranking, and a second ranking of the second candidate role name in the preset dictionary ranking may be obtained when the first candidate role name is different from the second candidate role name. According to the first ranking and the second ranking, the first candidate role name and the second candidate role name are ranked to obtain a ranking result. According to the ranking result, the first candidate role name is selected as the target role name when the first candidate role name is ranked before the second candidate role name, and role labeling is performed on the dialogue sentence based on the target role name.

In an embodiment of the disclosure, in the case where it is determined that the second candidate role name is ranked before the first candidate role name according to the ranking result, the second candidate role name is selected as the target role name, and role labeling is performed on the dialogue sentence based on the target role name.

Figure 3:
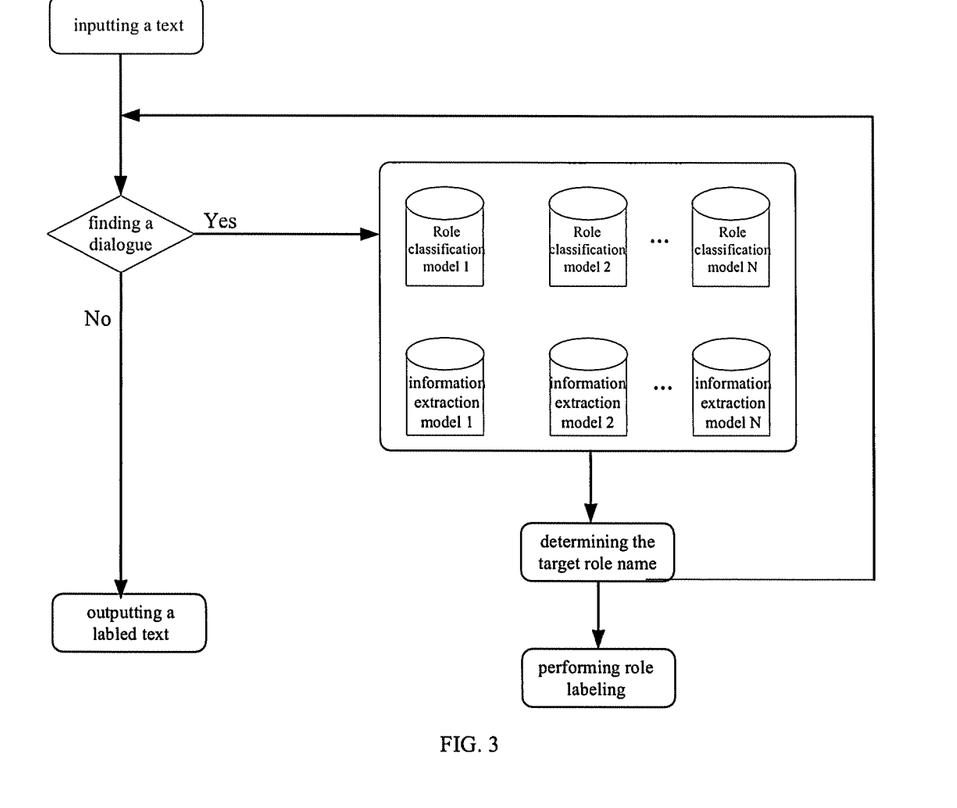
FIG. 3 is a schematic diagram illustrating a role labeling process according to an embodiment of the disclosure.

In an embodiment, as illustrated in FIG. 3, when a dialogue sentence is found in an input text, a spliced text obtained based on the found dialogue sentence and the context information of the found dialogue sentence is input into the information extraction model. There may be one or more information extraction models. For example, the role names in the spliced text are extracted through a plurality of information extraction models to obtain a plurality of first candidate role names, that is, one or more first candidate role names may be extracted based on each information extraction model.

After the role names in the spliced text are obtained, the role names and the spliced text are input into the role classification model. There may be one or more role classification models. For example, the role names and spliced text may be processed through the plurality of role classification models to obtain a plurality of second candidate role names, that is, one or more second candidate role names may be obtained based on each role classification model.

Furthermore, according to the plurality of first candidate role names and the plurality of second candidate role names, the target role name corresponding to the dialogue sentence may be determined, and the dialogue sentence is labeled according to the target role name.

With to the role labeling method of the embodiments of the disclosure, the dialogue sentence to be labeled and the context information corresponding to the dialogue sentence are obtained, and the context information and the dialogue sentence are spliced to obtain a spliced text. The location information of the role name of the dialogue sentence in the spliced text is obtained by inputting the spliced text into the information extraction model. The first candidate role name of the dialogue sentence is determined based on the location information. And then by obtaining the role names that appears in the spliced text, each role name and the spliced text are input into the role classification model to obtain the probability corresponding to each role name. The second candidate role name of the dialogue sentence is determined based on the probabilities of the role names. According to the first candidate role name and the second candidate role name, the target role name corresponding to the dialogue sentence is determined, and role labeling is performed on the dialogue sentence based on the target role name. Therefore, the first candidate role name corresponding to the dialogue sentence is determined by inputting the spliced text into the information extraction model, the role names appearing in the spliced text are obtained, the second candidate role name corresponding to the dialogue sentence is determined by inputting the spliced text and the role names appearing in the spliced text into the role classification model, one role name is randomly selected as the target role name corresponding to the dialogue sentence when it is determined that the first candidate role name is the same as the second candidate role name, so as to realize the automatic role labeling of the dialogue sentence according to the target role name. Therefore, the labor cost and time are saved, labeling efficiency is improved, and the problems such as high labor cost, long labeling duration, and low labeling efficiency caused by manual role labeling are solved.

Figure 4:
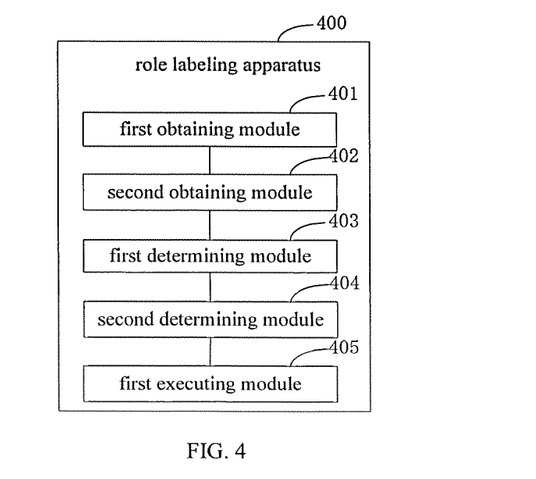
FIG. 4 is a schematic diagram of a role labeling apparatus according to an embodiment of the disclosure.
Figure 5:
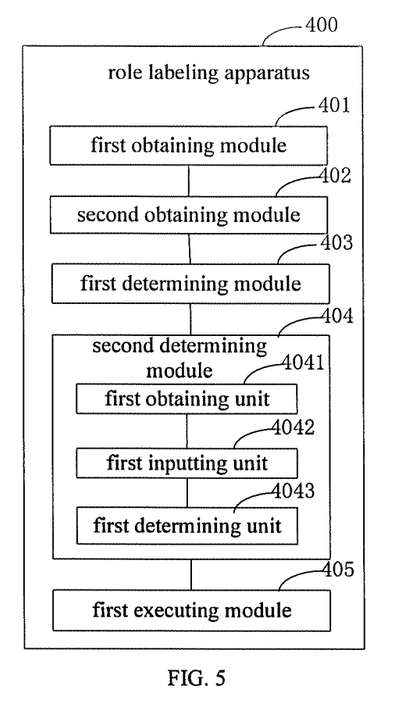
FIG. 5 is a schematic diagram of a role labeling apparatus according to an embodiment of the disclosure.
Figure 6:
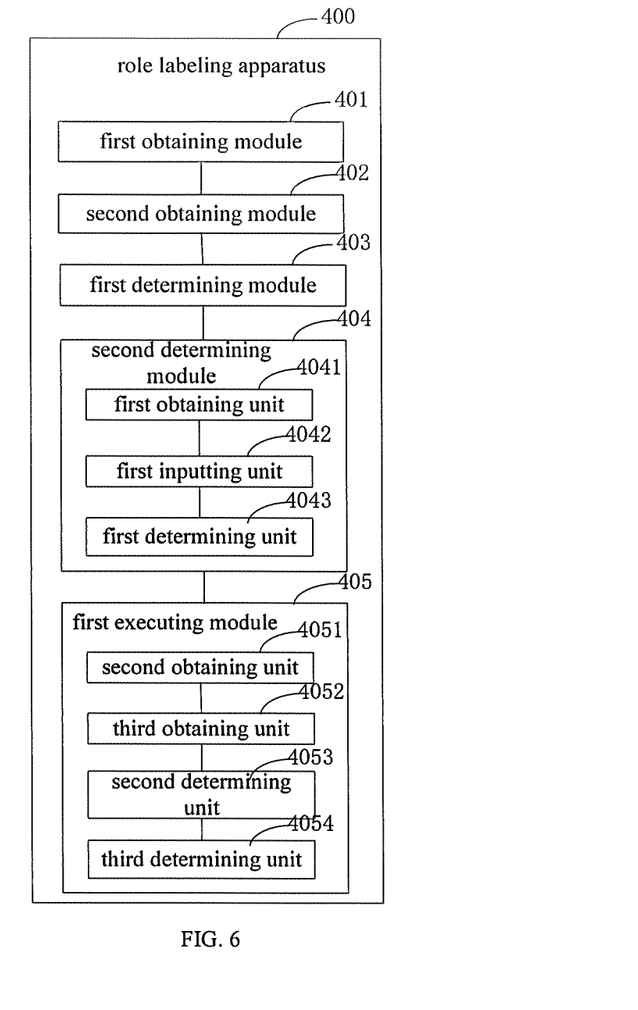
FIG. 6 is a schematic diagram of a role labeling apparatus according to an embodiment of the disclosure.

Corresponding to the role labeling method according to the embodiments, the embodiments of the disclosure also provides a role labeling apparatus, since the role labeling apparatus according to the embodiments of the disclosure corresponds to the role labeling method according to the embodiments of the disclosure, the implementation of the role labeling method is also applicable to the role labeling apparatus, which is not limited in the embodiments. FIGS. 4 to 6 are schematic diagrams of a role labeling apparatus according to embodiments of the disclosure.

As illustrated in FIG. 4, the role labeling apparatus 400 includes: a first obtaining module 401, a second obtaining module 402, a first determining module 403, a second determining module 404 and a first executing module 405.

The first obtaining module 401 is configured to obtain a dialogue sentence to be labeled and context information corresponding to the dialogue sentence, and splice the context information and the dialogue sentence to obtain a spliced text. For example, the first obtaining module 401 is configured to input the spliced text into an information extraction model to obtain the location information of the role name of the dialogue sentence in the spliced text.

The second obtaining module 402 is configured to extract location information of a role name of the dialogue sentence in the spliced text from the spliced text.

The first determining module 403 is configured to determine a first candidate role name of the dialogue sentence based on the location information. For example, the first determining module 403 is configured to: extract a target text between the starting location and the ending location from the spliced text, and determine the first candidate role name of the dialogue sentence based on the target text.

The second determining module 404 is configured to determine a second candidate role name of the dialogue sentence from role names in the spliced text. For example, as illustrated in FIG. 5, the second determining module 404 includes: a first obtaining unit 4041, a first inputting unit 4042 and a first determining unit 4043. The first obtaining unit 4041 is configured to obtain the role names in the spliced text. The first inputting unit 4042 is configured to input each role name and the spliced text into a role classification model to obtain a probability corresponding to each role name. The first determining unit 4043 is configured to determine the second candidate role name of the dialogue sentence based on the probabilities of the role names.

In an embodiment, the first obtaining unit 4041 is configured to: obtain a document where the dialogue sentence is located; obtain a role name set corresponding to the document, wherein the role name set comprises a plurality of third candidate role names; and for each third candidate role name, determine the third candidate role name as a role name in the spliced text in a case that a keyword corresponding to the third candidate role name exists in the spliced text.

In an embodiment, the role classification model includes an input layer, a semantic representation layer and a classification layer, the semantic representation layer includes a pre-trained language sub-model, and the classification layer includes a classification sub-model, and the first inputting unit 4042 is configured to: splice each role name and the spliced text through the input layer to obtain an intermediate spliced text corresponding to each role name; input each intermediate spliced text into the pre-trained language sub-model to obtain semantic characteristic information of each intermediate spliced text; and input the semantic characteristic information into the classification sub-model to obtain the probability corresponding to each role name.

The first executing module 405 is configured to determine a target role name of the dialogue sentence based on the first candidate role name and the second candidate role name, and perform role labeling on the dialogue sentence based on the target role name. For example, as illustrated in FIG. 6, the first executing module 405 includes: a second obtaining unit 4051, a third obtaining unit 4052, a second determining unit 4053 and a third determining unit 4054. The second obtaining unit 4051 is configured to obtain a document where the dialogue sentence is located. The third obtaining unit 4052 is configured to obtain a role name set corresponding to the document. The second determining unit 4053 is configured to determine that both the first candidate role name and the second candidate role name exist in the role name set. The third determining unit 4054 is configured to select one of the first candidate role name and the second candidate role name randomly as the target role name of the dialogue sentence when the first candidate role name is the same as the second candidate role name.

In an embodiment, the first executing module 405 further includes: a fourth obtaining unit, a ranking unit and a fourth determining unit. The fourth obtaining unit is configured to obtain a first ranking of the first candidate role name in a preset dictionary ranking, and obtain a second ranking of the second candidate role name in the preset dictionary ranking when the first candidate role name is different from the second candidate role name. The ranking unit is configured to rank the first candidate role name and the second candidate role name based on the first ranking and the second ranking to obtain a sort result. The fourth determining unit is configured to determine the first candidate role name as the target role name in response to determining that the first candidate role name ranks before the second candidate role name based on the sort result.

In an embodiment, the first executing module 405 further includes: a fifth determining unit, configured to determine the second candidate role name as the target role name in response to determining that the second candidate role name ranks before the first candidate role name based on the sort result.

With the role labeling apparatus of the embodiments of the disclosure, the dialogue sentence to be labeled and the context information corresponding to the dialogue sentence are obtained, and the context information and the dialogue sentence are spliced to obtain a spliced text, the location information of the role name of the dialogue sentence in the spliced text is extracted from the spliced text, the first candidate role name of the dialogue sentence is determined based on the location information, the second candidate role name of the dialogue sentence is determined from the role names that appear in the spliced text, the target role name of the dialogue sentence is determined based on the first candidate role name and the second candidate role name, and role labeling is performed on the dialogue sentence based on the target role name. Therefore, the target role name is determined by determining the first candidate role name and the second candidate role name of the dialogue sentence from the spliced text, so as to realize automatic role labeling of the dialogue sentence based on the target role name, thus, the labor cost and time are saved, labeling efficiency is improved, and the problems such as high labor cost and low labeling efficiency caused by manual role labeling are solved.

According to the embodiments of the disclosure, the disclosure also provides an electronic device and a readable storage medium.

Figure 7:
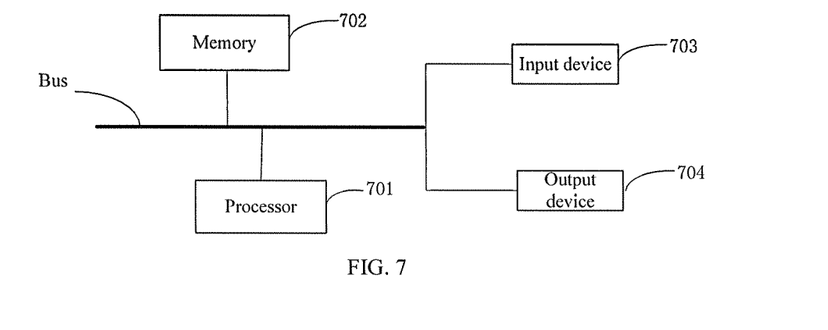
FIG. 7 is a block diagram of an electronic device used to implement the role labeling method according to an embodiment of the disclosure.

FIG. 7 is a block diagram of an electronic device used to implement the role labeling method according to the embodiments of the disclosure. Electronic devices are intended to represent various forms of digital computers, such as laptop computers, desktop computers, workbenches, personal digital assistants, servers, blade servers, mainframe computers, and other suitable computers. Electronic devices may also represent various forms of mobile devices, such as personal digital processing, cellular phones, smart phones, wearable devices, and other similar computing devices. The components shown here, their connections and relations, and their functions are merely examples, and are not intended to limit the implementation of the disclosure described and/or required herein.

As illustrated in FIG. 7, the electronic device includes: one or more processors 701, a memory 702, and interfaces for connecting various components, including a high-speed interface and a low-speed interface. The various components are interconnected using different buses and can be mounted on a common mainboard or otherwise installed as required. The processor may process instructions executed within the electronic device, including instructions stored in or on the memory to display graphical information of the GUI on an external input/output device such as a display device coupled to the interface. In other embodiments, a plurality of processors and/or buses can be used with a plurality of memories and processors, if desired. Similarly, a plurality of electronic devices can be connected, each providing some of the necessary operations (for example, as a server array, a group of blade servers, or a multiprocessor system). A processor 701 is taken as an example in FIG. 7.

The memory 702 is a non-transitory computer-readable storage medium according to the disclosure. The memory stores instructions executable by at least one processor, so that the at least one processor executes the method according to the disclosure. The non-transitory computer-readable storage medium of the disclosure stores computer instructions, which are used to cause a computer to execute the method according to the disclosure.

As a non-transitory computer-readable storage medium, the memory 702 is configured to store non-transitory software programs, non-transitory computer executable programs and modules, such as program instructions/modules (for example, the first obtaining module 401, the second obtaining module 402, the first determining module 403, the second determining module 404, and the first executing module 405 shown in FIG. 4) corresponding to the method in the embodiments of the disclosure. The processor 701 executes various functional applications and data processing of the electronic device by running non-transitory software programs, instructions, and modules stored in the memory 702, that is, implementing the method in the foregoing method embodiments.

The memory 702 may include a storage program area and a storage data area, where the storage program area may store an operating system and application programs required for at least one function. The storage data area may store data created according to the use of the electronic device for implementing the method. In addition, the memory 702 may include a high-speed random access memory, and a non-transitory memory, such as at least one magnetic disk storage device, a flash memory device, or other non-transitory solid-state storage device. In some embodiments, the memory 702 may optionally include a memory remotely disposed with respect to the processor 701, and these remote memories may be connected to the electronic device for implementing the method through a network. Examples of the above network include, but are not limited to, the Internet, an intranet, a local area network, a mobile communication network, and combinations thereof.

The electronic device used to implement the method may further include: an input device 703 and an output device 704. The processor 701, the memory 702, the input device 703, and the output device 704 may be connected through a bus or in other manners. In FIG. 7, the connection through the bus is taken as an example.

The input device 703 may receive inputted numeric or character information, and generate key signal inputs related to user settings and function control of an electronic device for implementing the method, such as a touch screen, a keypad, a mouse, a trackpad, a touchpad, an indication rod, one or more mouse buttons, trackballs, joysticks and other input devices. The output device 704 may include a display device, an auxiliary lighting device (for example, an LED), a haptic feedback device (for example, a vibration motor), and the like. The display device may include, but is not limited to, a liquid crystal display (LCD), a light emitting diode (LED) display, and a plasma display. In some embodiments, the display device may be a touch screen.

Various embodiments of the systems and technologies described herein may be implemented in digital electronic circuit systems, integrated circuit systems, application specific integrated circuits (ASICs), computer hardware, firmware, software, and/or combinations thereof. These various embodiments may be implemented in one or more computer programs, which may be executed and/or interpreted on a programmable system including at least one programmable processor. The programmable processor may be dedicated or general purpose programmable processor that receives data and instructions from a storage system, at least one input device, and at least one output device, and transmits the data and instructions to the storage system, the at least one input device, and the at least one output device.

These computing programs (also known as programs, software, software applications, or code) include machine instructions of a programmable processor and may utilize high-level processes and/or object-oriented programming languages, and/or assembly/machine languages to implement these calculation procedures. As used herein, the terms "machine-readable medium" and "computer-readable medium" refer to any computer program product, device, and/or device used to provide machine instructions and/or data to a programmable processor (for example, magnetic disks, optical disks, memories, programmable logic devices (PLDs), including machine-readable media that receive machine instructions as machine-readable signals. The term "machine-readable signal" refers to any signal used to provide machine instructions and/or data to a programmable processor.

In order to provide interaction with a user, the systems and techniques described herein may be implemented on a computer having a display device (e.g., a Cathode Ray Tube (CRT) or a Liquid Crystal Display (LCD) monitor for displaying information to a user); and a keyboard and pointing device (such as a mouse or trackball) through which the user can provide input to the computer. Other kinds of devices may also be used to provide interaction with the user. For example, the feedback provided to the user may be any form of sensory feedback (e.g., visual feedback, auditory feedback, or haptic feedback), and the input from the user may be received in any form (including acoustic input, voice input, or tactile input).

The systems and technologies described herein can be implemented in a computing system that includes background components (for example, a data server), or a computing system that includes middleware components (for example, an application server), or a computing system that includes front-end components (for example, a user computer with a graphical user interface or a web browser, through which the user can interact with the implementation of the systems and technologies described herein), or include such background components, intermediate computing components, or any combination of front-end components. The components of the system may be interconnected by any form or medium of digital data communication (egg, a communication network). Examples of communication networks include: local area network (LAN), wide area network (WAN), and the Internet.

The computer system may include a client and a server. The client and server are generally remote from each other and interacting through a communication network. The client-server relation is generated by computer programs running on the respective computers and having a client-server relation with each other. The server may be a cloud server, also known as a cloud computing server or a cloud host, which is a host product in the cloud computing service system, to solve defects such as difficult management and weak business scalability in the traditional physical host and Virtual Private Server (VPS) service.

With to the technical solution of the embodiments of the disclosure, the dialogue sentence to be labeled and the context information corresponding to the dialogue sentence are obtained, and the context information and the dialogue sentence are spliced to obtain a spliced text, the location information of the role name of the dialogue sentence in the spliced text is extracted from the spliced text, the first candidate role name of the dialogue sentence is determined based on the location information, the second candidate role name of the dialogue sentence is determined from the role names that appear in the spliced text, the target role name of the dialogue sentence is determined based on the first candidate role name and the second candidate role name, and role labeling is performed on the dialogue sentence based on the target role name. Therefore, the target role name is determined by determining the first candidate role name and the second candidate role name of the dialogue sentence from the spliced text, so as to realize automatic role labeling of the dialogue sentence based on the target role name, thus, the labor cost and time are saved, labeling efficiency is improved, and the problems such as high labor cost and low labeling efficiency caused by manual role labeling are solved.

It should be understood that the various forms of processes shown above can be used to reorder, add or delete steps. For example, the steps described in the disclosure could be performed in parallel, sequentially, or in a different order, as long as the desired result of the technical solution disclosed in the disclosure is achieved, which is not limited herein.

The above specific embodiments do not constitute a limitation on the protection scope of the disclosure. Those skilled in the art should understand that various modifications, combinations, sub-combinations and substitutions can be made according to design requirements and other factors. Any modification, equivalent replacement and improvement made within the spirit and principle of this application shall be included in the protection scope of this application.

What is claimed is:

1. A role labeling method, comprising:
obtaining a dialogue sentence to be labeled and context information corresponding to the dialogue sentence, and splicing the context information and the dialogue sentence to obtain a spliced text;
extracting location information of a role name of the dialogue sentence in the spliced text from the spliced text;
determining a first candidate role name of the dialogue sentence based on the location information;
determining a second candidate role name of the dialogue sentence from role names in the spliced text; and
determining a target role name of the dialogue sentence based on the first candidate role name and the second candidate role name, and performing role labeling on the dialogue sentence based on the target role name.

2. The method according to claim 1, wherein determining the second candidate role name of the dialogue sentence from the role names in the spliced text comprises:

obtaining the role names in the spliced text;
inputting each role name and the spliced text into a role classification model to obtain a probability corresponding to each role name; and
determining the second candidate role name of the dialogue sentence based on the probabilities of the role names.

3. The method according to claim 2, wherein obtaining the role names in the spliced text comprises:
obtaining a document where the dialogue sentence is located;
obtaining a role name set corresponding to the document, wherein the role name set comprises a plurality of third candidate role names; and
for each third candidate role name, determining the third candidate role name as a role name in the spliced text in a case that a keyword corresponding to the third candidate role name exists in the spliced text.

4. The method according to claim 2, wherein the role classification model comprises an input layer, a semantic representation layer and a classification layer, the semantic representation layer comprises a pre-trained language sub-model, and the classification layer comprises a classification sub-model, and inputting each role name and the spliced text into the role classification model to obtain the probability corresponding to each role name comprises:
splicing each role name and the spliced text through the input layer to obtain an intermediate spliced text corresponding to each role name;
inputting each intermediate spliced text into the pre-trained language sub-model to obtain semantic characteristic information of each intermediate spliced text; and
inputting the semantic characteristic information into the classification sub-model to obtain the probability corresponding to each role name.

5. The method according to claim 1, wherein determining the target role name of the dialogue sentence based on the first candidate role name and the second candidate role name comprises:
obtaining a document where the dialogue sentence is located;
obtaining a role name set corresponding to the document; and
in a case of determining that both the first candidate role name and the second candidate role name exist in the role name set, selecting one of the first candidate role name and the second candidate role name randomly as the target role name of the dialogue sentence when the first candidate role name is the same as the second candidate role name.

6. The method according to claim 5, further comprising:
obtaining a first ranking of the first candidate role name in a preset dictionary ranking, and obtaining a second ranking of the second candidate role name in the preset dictionary ranking when the first candidate role name is different from the second candidate role name;
ranking the first candidate role name and the second candidate role name based on the first ranking and the second ranking to obtain a sort result; and
determining the first candidate role name as the target role name in response to determining that the first candidate role name ranks before the second candidate role name based on the sort result.

7. The method according to claim 6, further comprising: determining the second candidate role name as the target role name in response to determining that the second candidate role name ranks before the first candidate role name based on the sort result.

8. The method according to claim 1, wherein the location information comprises a starting location and an ending location, and determining the first candidate role name of the dialogue sentence based on the location information comprises:
extracting a target text between the starting location and the ending location from the spliced text; and
determining the first candidate role name of the dialogue sentence based on the target text.

9. The method according to claim 1, wherein extracting the location information of the role name of the dialogue sentence in the spliced text from the spliced text comprises:
inputting the spliced text into an information extraction model to obtain the location information of the role name of the dialogue sentence in the spliced text.

10. An electronic device, comprising:
at least one processor; and
a memory communicatively connected with the at least one processor; wherein,
the memory stores instructions executable by the at least one processor, and when the instructions are executed by the at least one processor, the at least one processor is caused to execute a role labeling method, the method comprising:
obtaining a dialogue sentence to be labeled and context information corresponding to the dialogue sentence, and splicing the context information and the dialogue sentence to obtain a spliced text;
extracting location information of a role name of the dialogue sentence in the spliced text from the spliced text;
determining a first candidate role name of the dialogue sentence based on the location information;
determining a second candidate role name of the dialogue sentence from role names in the spliced text; and
determining a target role name of the dialogue sentence based on the first candidate role name and the second candidate role name, and performing role labeling on the dialogue sentence based on the target role name.

11. The electronic device according to claim 10, wherein determining the second candidate role name of the dialogue sentence from the role names in the spliced text comprises:
obtaining the role names in the spliced text;
inputting each role name and the spliced text into a role classification model to obtain a probability corresponding to each role name; and
determining the second candidate role name of the dialogue sentence based on the probabilities of the role names.

12. The electronic device according to claim 11, wherein obtaining the role names in the spliced text comprises:
obtaining a document where the dialogue sentence is located;
obtaining a role name set corresponding to the document, wherein the role name set comprises a plurality of third candidate role names; and
for each third candidate role name, determining the third candidate role name as a role name in the spliced text in a case that a keyword corresponding to the third candidate role name exists in the spliced text.

13. The electronic device according to claim 11, wherein the role classification model comprises an input layer, a semantic representation layer and a classification layer, the semantic representation layer comprises a pre-trained language sub-model, and the classification layer comprises a classification sub-model, and inputting each role name and the spliced text into the role classification model to obtain the probability corresponding to each role name comprises:

splicing each role name and the spliced text through the input layer to obtain an intermediate spliced text corresponding to each role name;

inputting each intermediate spliced text into the pre-trained language sub-model to obtain semantic characteristic information of each intermediate spliced text; and inputting the semantic characteristic information into the classification sub-model to obtain the probability corresponding to each role name.

14. The electronic device according to claim 10, wherein determining the target role name of the dialogue sentence based on the first candidate role name and the second candidate role name comprises:

obtaining a document where the dialogue sentence is located;

obtaining a role name set corresponding to the document; and in a case of determining that both the first candidate role name and the second candidate role name exist in the role name set, selecting one of the first candidate role name and the second candidate role name randomly as the target role name of the dialogue sentence when the first candidate role name is the same as the second candidate role name.

15. The electronic device according to claim 14, wherein the method further comprises:

obtaining a first ranking of the first candidate role name in a preset dictionary ranking, and obtaining a second ranking of the second candidate role name in the preset dictionary ranking when the first candidate role name is different from the second candidate role name;

ranking the first candidate role name and the second candidate role name based on the first ranking and the second ranking to obtain a sort result; and determining the first candidate role name as the target role name in response to determining that the first candidate role name ranks before the second candidate role name based on the sort result.

16. The electronic device according to claim 15, wherein the method further comprises:

determining the second candidate role name as the target role name in response to determining that the second candidate role name ranks before the first candidate role name based on the sort result.

17. The electronic device according to claim 10, wherein the location information comprises a starting location and an ending location, and determining the first candidate role name of the dialogue sentence based on the location information comprises:

extracting a target text between the starting location and the ending location from the spliced text; and determining the first candidate role name of the dialogue sentence based on the target text.

18. The electronic device according to claim 10, wherein extracting the location information of the role name of the dialogue sentence in the spliced text from the spliced text comprises:

inputting the spliced text into an information extraction model to obtain the location information of the role name of the dialogue sentence in the spliced text.

19. A non-transitory computer-readable storage medium storing computer instructions, wherein the computer instructions are configured to make a computer execute a role labeling method, the method comprising:

obtaining a dialogue sentence to be labeled and context information corresponding to the dialogue sentence, and splicing the context information and the dialogue sentence to obtain a spliced text;

extracting location information of a role name of the dialogue sentence in the spliced text from the spliced text;

determining a first candidate role name of the dialogue sentence based on the location information;

determining a second candidate role name of the dialogue sentence from role names in the spliced text; and determining a target role name of the dialogue sentence based on the first candidate role name and the second candidate role name, and performing role labeling on the dialogue sentence based on the target role name.

20. The non-transitory computer-readable storage medium according to claim 19, wherein determining the second candidate role name of the dialogue sentence from the role names in the spliced text comprises:

obtaining the role names in the spliced text;

inputting each role name and the spliced text into a role classification model to obtain a probability corresponding to each role name; and determining the second candidate role name of the dialogue sentence based on the probabilities of the role names.

* * * * *